United States Patent
Weidinger

(10) Patent No.: US 9,940,489 B2
(45) Date of Patent: Apr. 10, 2018

(54) RADIOFREQUENCY TRANSPONDER CIRCUIT

(71) Applicant: NXP B.V., Eindhoven (NL)

(72) Inventor: Christian Weidinger, Graz (AT)

(73) Assignee: NXP B.V., Eindhoven (NL)

( * ) Notice: Subject to any disclaimer, the term of this patent is extended or adjusted under 35 U.S.C. 154(b) by 183 days.

(21) Appl. No.: 14/745,307

(22) Filed: Jun. 19, 2015

(65) Prior Publication Data

US 2015/0371066 A1   Dec. 24, 2015

(30) Foreign Application Priority Data

Jun. 20, 2014   (EP) .................................... 14173309

(51) Int. Cl.
  *G06K 7/10*   (2006.01)
  *G06F 21/35*   (2013.01)
  *H04W 12/06*   (2009.01)
  *G05B 23/00*   (2006.01)
  *G06K 7/00*   (2006.01)
  *G06K 19/07*   (2006.01)

(52) U.S. Cl.
  CPC ..... *G06K 7/10009* (2013.01); *G06K 19/0722* (2013.01)

(58) Field of Classification Search
  CPC . G06K 7/10; G06K 7/00; G06F 21/35; G05B 23/00
  USPC ................................................ 340/10.1, 10.5
  See application file for complete search history.

(56) References Cited

U.S. PATENT DOCUMENTS

| 7,193,504 B2* | 3/2007 | Carrender ............ G06K 7/0008 340/10.1 |
| 7,742,348 B2* | 6/2010 | Schuessler ........... H01Q 1/2225 340/10.1 |
| 7,963,443 B2* | 6/2011 | Patton ................ G06K 7/10237 235/451 |
| 9,146,806 B2* | 9/2015 | Bousquet ............. H04B 5/0056 |
| 9,239,941 B1* | 1/2016 | Diorio ................ G06K 7/10019 |

(Continued)

FOREIGN PATENT DOCUMENTS

| EP | 0640939 A2 | 3/1995 |
| EP | 1901201 A1 | 3/2008 |
| GB | 2507742 A | 5/2014 |

OTHER PUBLICATIONS

EP Search Report for EP Patent Application No. 14173309 dated Nov. 18, 2014.

*Primary Examiner* — Nam V Nguyen

(57) ABSTRACT

The invention relates to radiofrequency transponder circuits, and in particular to such transponder circuits having a unique identifier. Embodiments disclosed include a radiofrequency transponder circuit (100) comprising an antenna module (101), a control circuit (103) and a memory (104), the transponder circuit (100) being configured to respond to a read command received via the antenna module (101) by the control circuit (103) reading and transmitting an identifier stored in the memory (104) via the antenna module (101), wherein the control circuit (103) is configured to perform an integrity check on data stored in the memory (104) upon being powered up by a reader field a first time via the antenna module (101) and to not perform the integrity check for a predetermined time period upon being powered up by a reader field subsequent times via the antenna module (101).

20 Claims, 2 Drawing Sheets

(56) References Cited

U.S. PATENT DOCUMENTS

2008/0034183 A1* 2/2008 Drago .................. G06F 21/445
                                                    711/219
2008/0068134 A1* 3/2008 Kimura ................ G06K 7/0008
                                                    340/10.1
2008/0100433 A1   5/2008 Desch

* cited by examiner

RADIOFREQUENCY TRANSPONDER CIRCUIT

CROSS-REFERENCE TO RELATED APPLICATIONS

This application claims the priority under 35 U.S.C. § 119 of European patent application no. 14173309.7, filed on Jun. 20, 2014, the contents of which are incorporated by reference herein.

FIELD

The invention relates to radiofrequency transponder circuits, and in particular to such transponder circuits having a unique identifier.

BACKGROUND

Radio Frequency Identification (RFID) is a technology that is widely used to automatically identify objects or persons without the need for line-of-sight communication by the use of electric or magnetic fields or radio waves. RFID transponders typically have no internal power supply, and instead receive sufficient power to operate by extracting electrical power from a received signal. To allow an RFID transponder to be unambiguously identified, enabling identification of the item to which it is associated, each transponder has a stored Unique Identifier (UID), a term used in the international standard ISO15693. The UID is typically programmed during production tests at the IC vendor and ensures the uniqueness of each identifier. The UID can then be linked to a physical object or a person.

There are two basic schemes of communication used in RFID: Reader Talks First (RTF) and Tag Talks First (TTF). Tag Talks First means, whenever a transponder is powered up by a reader field, it starts transmitting its UID and repeating it. The Reader has to catch these transmissions to identify the transponders in its field. The Tag Talks First scheme allows very simple transponders at the cost of there being no possibility for more advanced and faster identification methods or additional read/write memory. To overcome these limitations Reader Talks First can be used. This means the transponder has to wait until it receives an instruction from the reader to execute a predefined action, e.g. responding with its UID.

A persistent flag is a flag that is preserved throughout a short period of no power supply (for example during a field reset). This is used in RFID systems, particularly those having no internal power supply, to keep the identification state of an RFID transponder during short periods of no power. Basic information comprising an identification state typically relates to whether the transponder has already been identified (i.e. the UID has been successfully read by the system), indicating that there is no need to participate in the identification procedure any longer, or whether the transponder has not yet been identified (i.e. the UID has not yet been read successfully by the system), indicating that the transponder needs to participate in the identification procedure. A typical application is in the case of tunnel readers, which are capable of reading RFID transponders in every orientation and have at least three differently oriented antennae. The reader periodically switches between these antennae during the identification procedure, resulting in any transponders within range not being powered during the time needed for switching between the antennae or when a particular antenna orientation does not provide sufficient power. A persistent flag for such a purpose is specified for example in the international standard ISO18000-3M3.

Non-volatile memory can be used to store data together with redundant information to enable detection and possibly correction of the stored data in case of bit errors. A logical byte (8 bits) may for example be stored in 12 physical bits, which enables correction of an error in any given bit. This means, however, that to read one byte, or even when only reading one bit of information, 12 bits need to be read to enable this level of error correction.

Some transponders also contain a signature that is calculated over the UID to prove its authenticity. This signature would be invalid if any bit of the UID or the signature changes in the field, thereby enabling a reader to interrogate a transponder to determine its validity.

Smart Card ICs typically employ a checksum stored in system memory that is calculated for any security relevant data during each start-up routine.

Most RFID transponders comprise user memory (i.e. a memory that is read/write accessible for the user). It is therefore possible for an RFID system to calculate a checksum over the UID and store it in the user memory for checking.

A checksum may for example be useful for the RFID transponder itself to check during a start-up routine whether the UID has been altered or corrupted in any way, which might occur as a result of mechanical shocks or extreme environmental conditions. A problem with this approach, however, is the need for additional data to be read from the transponder memory, which adds time to the start-up routine. As well as the UID, the configuration data and the checksum would need to be read at start-up, and an integrity check performed, before the transponder is able to respond to a signal. This would delay the time at which the transponder could respond to the presence of a read signal being transmitted. Either more time would need to be allowed for the start-up routine or the transponder would need to operate at a faster rate during start-up. The first option may not be possible due to the requirements defined by international standards such as ISO15693 to be ready to process a command within a given time period (which is specified in ISO15693 to be a maximum of 1 ms). The second option is also not generally possible or desirable because this would require more power to be used, resulting in a negative impact on the operating range of the transponder.

A worst case scenario for a sequence of operations in a read operation for a transponder may involve the following steps:

1. A field reset operation;
2. A limited time being set by the reader for the transponder to perform a start-up routine;
3. Issuing of an identification command; and
4. Proceeding directly to step 1 if no response is received from a transponder.

If a transponder is not able to complete its start-up routine within the limited time available, it will not be able to process the identification command and will therefore never be identified.

It is an object of the invention to address one or more of the above mentioned problems.

SUMMARY

In accordance with a first aspect of the invention there is provided a radiofrequency transponder circuit comprising an antenna module, a control circuit and a memory, the transponder circuit being configured to respond to a reader command received via the antenna module by the control circuit reading and transmitting an identifier stored in the memory via the antenna module, wherein the control circuit is configured to perform an integrity check on data stored in the memory upon being powered up by a reader field a first time via the antenna module and to not perform the integrity check for a predetermined time upon being subsequently powered up by a reader field.

By performing the integrity check only on first receiving a reader field, the transponder circuit is able to respond in time to subsequent reader field transmissions (which are generally repeated in rapid succession) within a required time period while still ensuring that the identifier stored in the memory is valid.

The reader field may be an electric field, a magnetic field or an electromagnetic wave transmitted by an RFID reader for enabling transponders within range of the reader to be powered up.

The control circuit may be configured to read data including the identifier and a checksum from the memory and perform the integrity check by performing a checksum function on the identifier.

The control circuit may be configured to deactivate the transponder circuit in the event of failure of the integrity check. This ensures that the transponder circuit does not transmit an invalid identifier, for example in the event that the memory has been corrupted or modified in some way. The control circuit may alternatively be configured to transmit an error signal in response to a read signal such as a reader command (in the case of the RTF scheme of communication) in the event of failure of the integrity check, thereby enabling a reader device to determine that the transponder is faulty or invalid.

The predetermined time may be one second, five seconds, one minute or longer, and may for example be within a range from one second to one hour depending on the type of application. A transponder for use in environments where there is a greater risk of the memory being corrupted or modified may be configured to set the predetermined time period to be shorter than in a transponder for use in environments where there is a lower risk of corruption or modification.

The predetermined time may be determined by a persistent flag, which can be configured to decay over a time period dependent on the rate of leakage of a capacitor. The predetermined time may alternatively be determined by setting a number of cycles of powering up the transponder circuit, after which the control circuit will again perform the integrity check. The number of cycles may be set by a number of persistent flags. The predetermined time may be set by a value stored in the memory, although this would require power to check and reset the value after the predetermined time expires. It would also be necessary to maintain power in the transponder circuit while the reader field is inactive to enable the control circuit to determine when the predetermined time expires. Employing one or more persistent flags, which can be configured to expire after the predetermined time without the need for the transponder circuit to be powered, removes the need for the circuit to be powered when not within range of a reader. A single persistent flag set to indicate whether or not an integrity check is to be performed avoids issues relating to different flags decaying at differing rates, which would result in multiple flags being reset at different times.

The control circuit may be configured to set the flag after performing the integrity check to indicate that the integrity check is to be subsequently not performed for the predetermined time period. If the predetermined time is set by a flag stored in the memory, the control circuit may be configured to reset the flag after expiry of the predetermined time period.

The control circuit may be configured to check the status of the flag upon receiving a reader field via the antenna module and to perform the integrity check only if the flag is set.

The radiofrequency transponder circuit may be provided as part of a radiofrequency transponder comprising the transponder circuit and an antenna connected to the antenna module.

In accordance with a second aspect of the invention there is provided a method of operating a radiofrequency transponder circuit according to the first aspect, the method comprising:

powering up the transponder circuit by a reader field via the antenna module a first time;
reading an identifier from data stored in the memory;
performing an integrity check on the identifier;
setting a flag if the integrity check succeeds;
receiving a reader command via the antenna module;
transmitting the identifier via the antenna module in response to the reader command; and
not performing the integrity check upon being powered up by a subsequent reader field while the flag remains set.

The various optional features of the first aspect, such as the flag being a persistent flag, may also apply to the second aspect.

The embodiments described herein are based on, but not necessarily limited to, a Reader Talks First RFID communication scheme.

DESCRIPTION OF THE DRAWINGS

The invention is described in further detail below by way of example, with reference to the accompanying drawings in which.

DETAILED DESCRIPTION

Figure 1:
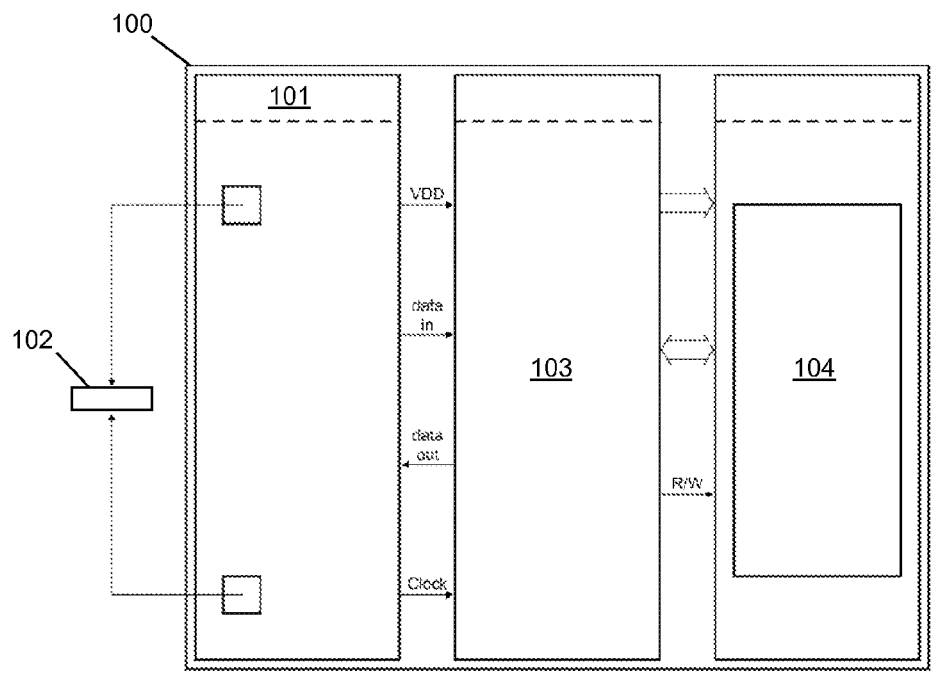
FIG. 1 is a schematic diagram of an exemplary RFID transponder.

FIG. 1 illustrates a schematic block diagram of a typical RFID transponder, based on the existing NXP ICODE SLIX transponder IC. Other types of transponders will have similar features, although certain details may vary. The transponder circuit 100 comprises the basic components of an antenna module 101 connected to an antenna 102, a control circuit module 103 and a memory module 104. The antenna module 101 comprises various sub modules such as a rectifier and demodulator for obtaining power supply and data signals from a signal received via the antenna 102, a clock module for generating a clock signal and a modulator for modulating an output signal for transmission by the antenna 102. The control circuit module 103 is configured to obtain a supply voltage VDD and clock signal from the antenna module 101, receive data from the antenna module 101 and transmit data to the antenna module 101. The control circuit module 103 is also configured to read and write data to and from the memory module 104.

Figure 2:
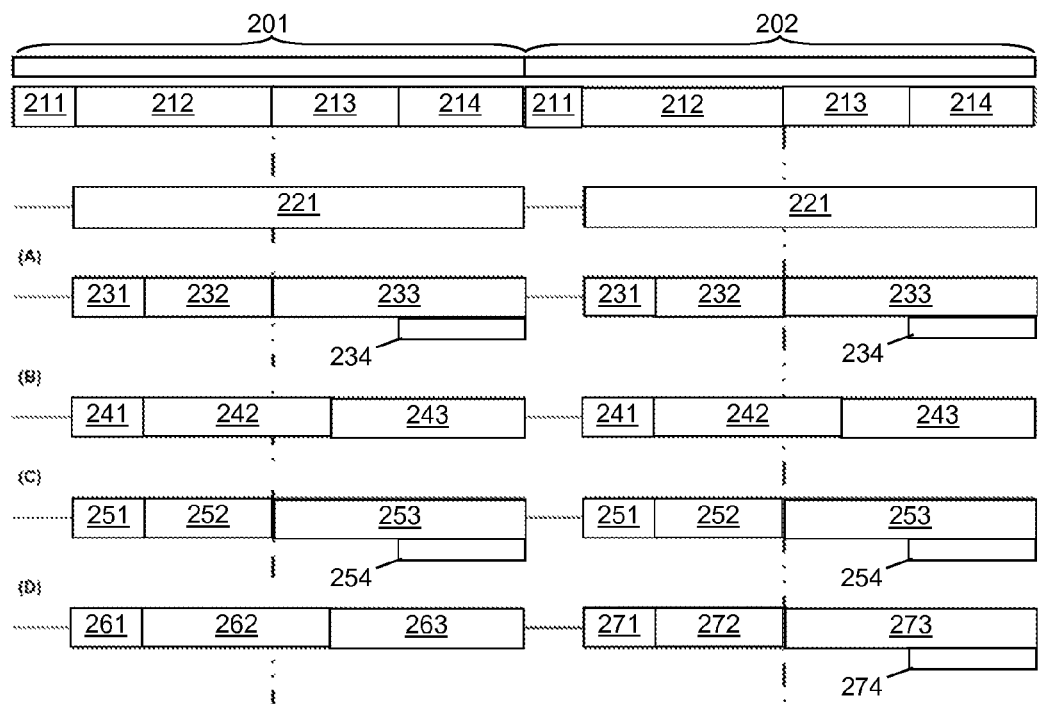
FIG. 2 is a diagram representing sequences of operations during successive read rounds for different types of transponders.

A typical RFID reader is not necessarily able to determine when any particular transponder enters a reader field, and may therefore be configured to poll continuously for any transponders that might be present. FIG. 2 illustrates an example sequence of operations according to the 'worst case' scenario outlined above. The reader performs successive rounds 201, 202, two of which are shown in FIG. 2. The reader will typically continue to carry out these rounds on a continuous basis. Each round involves a field reset 211, followed by a start-up time period 212 that allows any transponder within range to perform its start-up routine. Once the start-up time period 212 ends, the reader issues an identification command 213 and then waits in a subsequent period 214 to receive any signals in response to the command. Once the timeout period 214 for any transponders within range to respond to the identification command 213 ends, the reader performs a field reset 211, beginning a subsequent round 202. Carrier power 221 is available to any transponder within range only during the start-up period 212 and identification command period 213 and the response period 214. The absence of carrier power 221 during a field reset 211 causes any transponder within range to restart its start-up routine after each field reset 211.

Four different types of transponder behaviour, (A) to (D) are illustrated in FIG. 2. Type (A) represents a transponder with no integrity check performed during start-up, i.e. typical operation of a conventional RFID transponder. Type (B) represents a transponder with an integrity check during start-up. Type (C) represents a transponder with a data integrity check and faster reading from memory (involving a higher power requirement). Type (D) involves a transponder with a data integrity check upon first receiving a reader field, which triggers an integrity check and causes a persistent flag to be set to bypass subsequent integrity checks. Type (D) represents a transponder configured according to an embodiment of the invention.

For a type (A) transponder, the start-up routine is performed in a first time period 231, which ends well before the end of the time period 212 allowed by the reader. The transponder then waits for a command to be issued during a second time period 232. The transponder then receives and executes the identification command 213 during a third time period 233, sending a response during a final part 234 of the third time period 233. The type (A) transponder is therefore capable of responding in time during each round 201, 202, but does not perform any integrity checks.

For a type (B) transponder, the start-up time period 241 is extended by incorporating a period 242 for reading additional data and a checksum, together with performing a checksum verification routine. This extends the effective start-up period beyond the period 212 allowed by the reader. In a third time period 243, the transponder waits for a command issued by the reader, but this period starts after the time the reader issues the identification command 213, so the transponder cannot respond. The procedure then repeats, with the transponder carrying out the extended start-up procedure each time a field reset operation 211 is performed. The effect is that the transponder can never respond to the reader.

For a type (C) transponder, the transponder is configured in a similar way to the type (B) transponder, but with an increased speed at which the transponder is able to read data from memory and perform the checksum operation. The initial start-up period 251 is the same as that for the type (B) transponder, but the second time period 252 where data and a checksum is read from the memory and the checksum operation performed is shortened. The result is that the transponder completes its start-up routine within the period 212 allowed by the reader, and is able to respond to the identification command 213 within a third time period 253, and sends a response during a final part 254 of the third time period 253. The transponder is able to respond in time during each round 201, 202, although at the expense of a reduction in the range of operation from the reader due to the increased power required to operate the transponder within the shortened time period 252.

For a type (D) transponder, i.e. a transponder configured according to an embodiment of the invention, the initial start-up period 261 may be the same as for (A), (B) and (C) type transponders, with a further second time period 262 involving the transponder reading data and a checksum, and carrying out an integrity check. The total start-up period for the type (D) transponder extends beyond the period 212 allowed by the reader, resulting in the transponder being unable to respond to the identification command during a third time period 263. For this type of transponder, however, once the integrity check has been carried out successfully during the first round 201, the transponder is configured to bypass the integrity check for subsequent rounds for a preset time period, for example by setting a persistent flag in the transponder that indicates a successful verification of the checksum. After the reader performs a field reset 211, in the subsequent start-up 271 the integrity check is skipped and the start-up period ends within the time period 212 allowed by the reader. As with transponders of types (A) and (C), the transponder then waits for a command to be issued by the reader during a second time period 272, receives and executes the identification command during a third time period 273 and sends a response during a final part 274 of the third time period 273. The overall result is that the transponder of type (D) is able to respond to the reader with only a minor delay needed to perform an integrity check, which only needs to be performed once during a preset time period, and without adversely affecting the operating distance of the transponder.

A flag indicating a successful data integrity check is preferably set by use of a single persistent flag because this will decay at a known rate while the transponder is without power. The flag could alternatively be set in the memory, but this would require the transponder to determine how long the flag has been set for, which would require the transponder to be powered during periods when it is not within range of a reader. Setting the flag in memory would also require a more complex control circuit and additional time, typically around 4 ms, whereas setting a single persistent flag could be done within around 0.2 ms.

Figure 3:
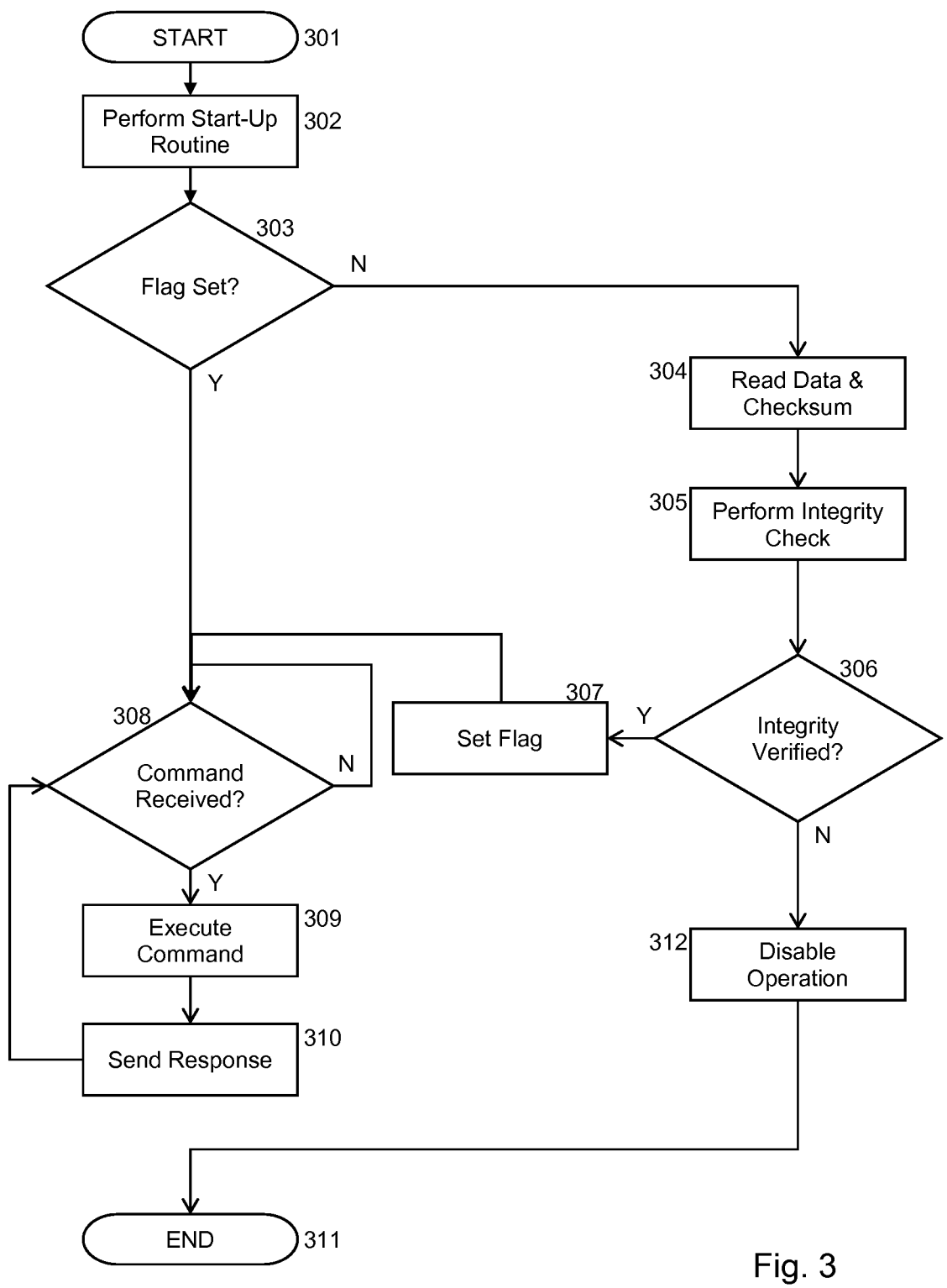
FIG. 3 is a schematic flow diagram illustrating an exemplary sequence of operations for an RFID transponder.

FIG. 3 is a schematic flow diagram illustrating an exemplary sequence of operations for a transponder according to an embodiment of the invention. Operation of the transponder begins at step 301, which occurs when the transponder first detects a reader field, for example after a field reset operation by a reader that is within range. The transponder starts by performing a conventional start-up routine (step 302), and then checks (step 303) whether a flag has been set with respect to whether an integrity check should be performed. If the flag has not been set, the transponder then reads data and a checksum from the memory (step 304) and performs an integrity check (step 305). If the integrity check succeeds (step 306), a flag indicating a successful integrity check is set (step 307) and the transponder proceeds to listen for receipt of a command (step 308). In some cases, the time taken to perform the start-up routine and carry out the integrity check will be less than the time allowed by the reader, and the transponder will therefore be able to respond to a command issued by the reader. In other cases, the transponder will continue to listen for a command until the next field reset operation, which terminates the sequence of operations. If a command is received, the transponder executes the command (step 309) and sends a response (step 310). The transponder then waits for the next command (step 308) while the transponder remains powered.

If, at step 303, the transponder determines that a flag indicating a successful integrity check has already been set, the transponder immediately proceeds to the step of listening for a command (step 308). In the case where the flag is not a persistent flag, i.e. does not decay over time, a check may first be made to determine whether the time period has been exceeded. If the time period has been exceeded, the flag is reset so that an integrity check will be carried out on a subsequent round. The transponder then proceeds to listen for a command to be received (step 308), and then executes a received command (step 309) and sends a response (step 310). The transponder could alternatively be configured to instead immediately perform an integrity check, i.e. by proceeding to step 304 after resetting the flag instead of proceeding to step 308.

If the integrity verification process (step 306) fails, the transponder is preferably disabled (step 312) and the sequence immediately terminated without listening for a command. This prevents the transponder from issuing a faulty identification code. The transponder could alternatively issue a response to any command received that indicates an error, enabling the reader to determine that a transponder within range has a fault.

Other embodiments are within the scope of the invention, which is defined by the appended claims.

The invention claimed is:

1. A radiofrequency transponder circuit comprising an antenna module, a control circuit and a memory, the transponder circuit being configured to respond to a reader command received via the antenna module by the control circuit reading and transmitting an identifier stored in the memory via the antenna module, wherein the control circuit is configured to perform an integrity check on data stored in the memory upon being powered up by a reader field a first time via the antenna module and to not perform the integrity check for a predetermined time upon being subsequently powered up by a reader field.

2. The radiofrequency transponder circuit of claim 1, wherein the control circuit is configured to read data including the identifier and a checksum from the memory and to perform the integrity check by performing a checksum function on the identifier.

3. The radiofrequency transponder circuit of claim 1, wherein the control circuit is configured to deactivate the transponder in the event of failure of the integrity check.

4. The radiofrequency transponder circuit of claim 1, wherein the control circuit is configured to transmit an error signal via the antenna module in response to the reader command in the event of failure of the integrity check.

5. The radiofrequency transponder circuit of claim 1, wherein the predetermined time is one second, five seconds, one minute or longer.

6. The radiofrequency transponder circuit of claim 1, wherein the predetermined time is set by a predetermined number of times the transponder circuit is powered up after performing the integrity check.

7. The radiofrequency transponder circuit of claim 1, wherein the control circuit is configured to set a flag after performing the integrity check to indicate that the integrity check is to be subsequently not performed for the predetermined time.

8. The radiofrequency transponder circuit of claim 7, wherein the control circuit is configured to reset the flag after expiry of the predetermined time period.

9. The radiofrequency transponder circuit of claim 7, wherein the flag is a persistent flag.

10. The radiofrequency transponder circuit of claim 7, wherein the control circuit is configured to check the status of the flag upon being powered up by the reader field via the antenna module and to perform the integrity check only if the flag is not set.

11. A radiofrequency transponder comprising the circuit of claim 1, and an antenna connected to the antenna module.

12. A method of operating a radiofrequency transponder circuit, the method comprising: powering up the transponder circuit by a reader field via the antenna module a first time; reading an identifier from data stored in the memory; performing an integrity check on the identifier; setting a flag if the integrity check succeeds; receiving a reader command via the antenna module; transmitting the identifier via the antenna module in response to the reader command; and not performing the integrity check upon being powered up by a subsequent reader field while the flag remains set.

13. The method of claim 12, comprising reading data including the identifier and a checksum from the memory and performing the integrity check by performing a checksum function on the identifier.

14. The method of claim 12, comprising deactivating the transponder in the event of failure of the integrity check.

15. The method of claim 12, comprising transmitting an error signal via the antenna module in response to the reader command in the event of failure of the integrity check.

16. The method of claim 12, wherein the predetermined time is set by a predetermined number of times the transponder circuit is powered up after performing the integrity check.

17. The method of claim 12, comprising setting a flag after performing the integrity check to indicate that the integrity check is to be subsequently not performed for the predetermined time.

18. The method of claim 17, comprising resetting the flag after expiry of the predetermined time period.

19. The method of claim 17, wherein the flag is a persistent flag.

20. The method of claim 17, comprising checking the status of the flag upon being powered up by the reader field via the antenna module and performing the integrity check only if the flag is not set.

* * * * *